United States Patent [19]

Jordan

[11] Patent Number: 4,867,473
[45] Date of Patent: Sep. 19, 1989

[54] METHOD FOR ADJUSTING CAMBER OF MACPHERSON STRUT

[76] Inventor: Robert O. Jordan, 2619 N. Scottsdale Rd., Scottsdale, Ariz. 85257

[21] Appl. No.: 225,844

[22] Filed: Jul. 29, 1988

[51] Int. Cl.$^4$ .............................................. B62D 17/00
[52] U.S. Cl. ..................................... 280/661; 280/668
[58] Field of Search ............... 280/668, 661, 673, 670, 280/696; 267/220

[56] References Cited

U.S. PATENT DOCUMENTS 4,213,631 7/1980 Wilkerson ............................ 280/661
4,372,575 2/1983 Hyma ................................... 280/661

Primary Examiner—Charles A. Marmor
Assistant Examiner—Karin Tyson
Attorney, Agent, or Firm—Tod R. Nissle

[57] ABSTRACT

A method and apparatus for adapting a MacPherson strut assembly to permit ready adjustment of the wheel spindle carried adjacent the lower end of the MacPherson strut. In the method, a drill bit asssemby is attached to the frame of a vehicle to permit apertures to be formed in the upper control member of the MacPherson strut to permit ready lateral adjustment of the strut and, consequently, to permit ready adjustment of the camber of the wheel spindle.

1 Claim, 6 Drawing Sheets

METHOD FOR ADJUSTING CAMBER OF MACPHERSON STRUT

This invention relates to the alignment of a wheel on a vehicle.

More particularly, the invention pertains to a method and apparatus for adjusting the camber of the wheel spindle carried on a lower control member of a vehicle with a compressible strut of the MacPherson type.

In another respect, the invention pertains to a method for adapting the cowling or control member at the upper end of a MacPherson strut to permit lateral adjustment of the upper end of the MacPherson strut to alter the camber of the wheel spindle carried on the control member at the lower end of the strut.

A variety of MacPherson strut designs are known in the art, along with various types of apparatus which permit the lateral adjustment of the upper end of the MacPherson strut. The ability to adjust the upper end of a MacPherson strut is important because such adjustment allows the camber of the wheel spindle carried on the control member at the lower end of the strut to be adjusted during wheel alignment procedures. In U.S. Pat. No. 4,372,575 to Hyma, elongate slots, identified by reference character 62 in FIGS. 1 to 3, are formed in the tower 18 which houses the upper end of the MacPherson strut. U.S. Pat. No. 4,213,631 to Wilkerson discloses a MacPherson strut assembly in which the upper reduced end 46 of the strut is received and positioned by a bracket 40. Bracket 40 is illustrated in FIG. 3 and includes aperture 45 which is bored through plate 40 in the location which appropriately adjusts the camber and/or castor of the wheel spindle carried on the strut. In use, the plate 40 described in the Wilkerson patent is somewhat impractical because each plate only permits the reduced end 46 to be positioned in four different positions, requiring that a substantial number of plates 40 with aperture 45 in differing positions be available to permit small incremental adjustments of the position of end 46 of the MacPherson strut. Longitudinal slots of the type shown in U.S. Pat. No. 4,372,575 are more practical in adjusting the position of the upper end of the MacPherson strut to alter the camber of the wheel spindle carried on the strut. The problem, however, is that there are many MacPherson strut assemblies of the general type illustrated in U.S. Pat. No. 4,213,631 to Wilkerson, and there apparently has not yet been devised a practical method to adapt such existing strut assemblies to permit the ready adjustment of the position of the upper end of the strut.

Accordingly, it would be highly desirable to provide a method for adapting existing MacPherson strut assemblies to permit the ready lateral adjustments of the upper end of the MacPherson strut through a series of small incremental adjustments during the alignment of the wheel spindle carried on the control member at the lower end of the MacPherson strut.

Therefore, it is a principal object of the invention to provide an improved process and apparatus for adjusting the alignment of the wheel spindle of a vehicle.

A further object of the invention is to provide an improved method for adjusting a vehicle wheel spindle carried on a lower control member with a compressible strut of the MacPherson type, the strut including an upper end bolted to an upper control member carried on the frame of the vehicle.

Another object of the invention is to provide an improved method for adjusting the upper end of a MacPherson strut in a vehicle, the method adapting the upper control member to which the upper end of the MacPherson strut is secured, the adaption of the upper control member permitting the position of the upper end of the MacPherson strut to be readily laterally adjusted.

Still another object of the invention is to provide an improved method of the type described which permits a cylindrical bit without a center tap to be utilized to accurately cut an aperture through the upper control member, said aperture facilitating the lateral adjustment of the upper end of the MacPherson strut with respect to the upper control member.

These and other, further and more specific objects and advantages of the invention will be apparent to those skilled in the art from the following detailed description thereof, taken in conjunction with the drawings, in which.

Briefly, in accordance with my invention, I provide an improved process for adjusting the camber of the wheel spindle carried on a lower control member of a vehicle with a compressible strut of the MacPherson type. The strut includes an upper end extending through an opening formed in an upper control member; and, bolt means extending through at least one aperture formed through the upper control means to secure the upper end of the strut to the upper control member. The vehicle includes a frame which includes the upper control member. The improved process includes the steps of loosening the bolt means and removing the upper end of the strut from the opening; placing template means on the upper control means to inscribe on the upper control member the location of at least one secondary aperture; attached above said opening to the frame circular drill bit means and means for rotating the drill bit means, the drill bit means including a hollow cylindrical wall circumscribing a control axis and having a lower cutting edge for cutting a circular opening in a piece of material, a backing plate attached to the cylindrical wall, and a rotatable bearing support surface contacting the plate to rotate with and support the plate to maintain the cylindrical wall equidistant from the central axis during the cutting of a piece of material with the cutting edge; operating the drill bit means and rotating means to cut the upper control member to enlarge the opening to increase the range of lateral movement of the upper end in the opening with respect to the fender means, the central axis extending through said opening during said enlarging of said opening; attaching to said frame and said upper control member above the upper control member second drill bit means and second means for rotating the second drill bit means; operating the second drill bit means to cut the secondary aperture within the inscription formed on the upper control member, the secondary aperture being sized to receive the bolt means and permit the bolt means to be moved laterally in the secondary aperture to adjust the camber of the wheel spindle; installing shim means on the upper control member, the shim means including a third aperture aligned over the secondary aperture, and a secondary opening aligned over the enlarged first opening in the upper control member; positioning the upper end in the enlarged opening with the bolt means extending upwardly through the secondary aperture and third aperture; moving the bolt means to a selected position with respect to the secondary aperture; and, tightening the bolt means to secure the upper end and shim in position on the upper control member.

Figure 1:
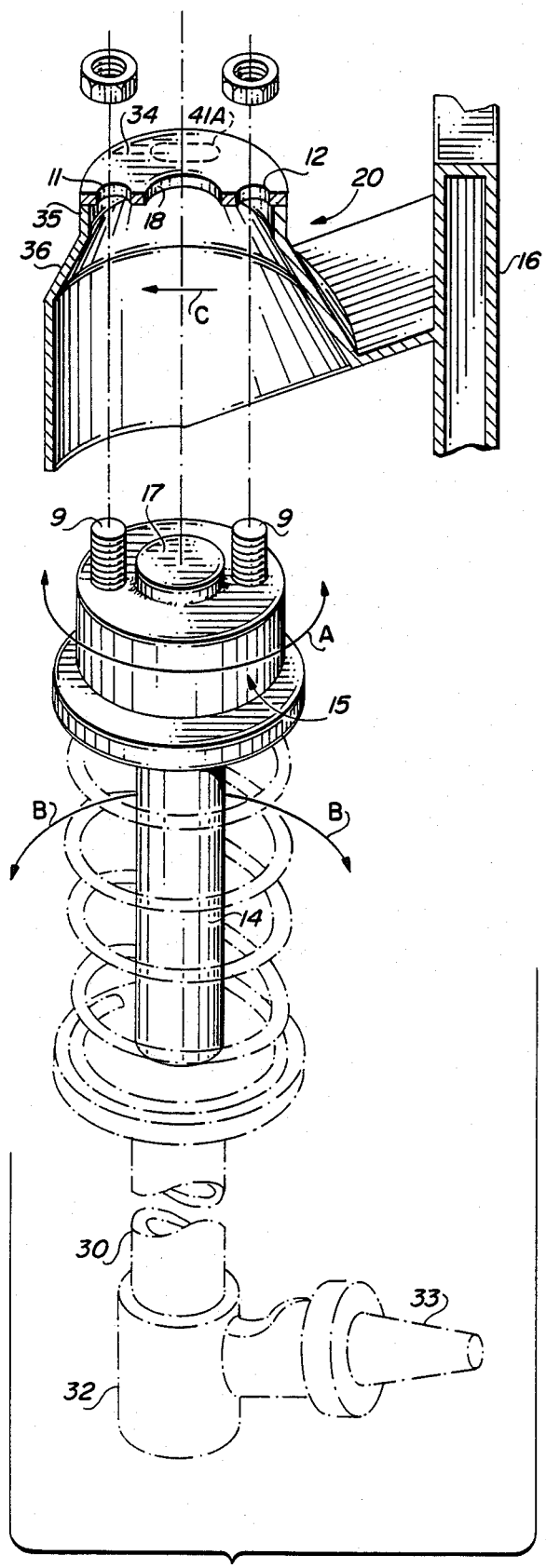
FIG. 1 is a perspective assembly view of the upper portion of a MacPherson strut assembly illustrating the upper end of the strut and the upper control member to which the upper end of the strut is secured.

Turning now to the drawings, which depict the presently preferred embodiment of the invention for the purpose of illustrating the practice thereof and not by way of limitation of the scope of the invention, and in which like reference characters refer to corresponding elements throughout the several views, FIGS. 1 to 8 illustrate the presently preferred embodiment of the invention. In FIG. 1 a conventional MacPherson strut assembly is illustrated and includes a strut having a hollow lower portion 30 which slidably receives a spring loaded 31 upper cylindrical portion 14. The tower 15 of the MacPherson strut includes upper end 17 and bolts 9 which extend upwardly through apertures 11 and 12 formed in cowling or upper control member 20. Nuts 114 secure bolts 9 and upper end 17 to upper control member 20. Upper end 17 extends upwardly through circular aperture 18 formed in control member 20. The outer diameter of cylindrical upper end 17 is normally slightly less than the inner diameter of circular aperture 18. Control member 20 is attached to fender 16. Fender 16 and member 20 comprise portions of the frame of an automobile or other vehicle. Lower portion 30 is connected to a lower control member 32 carrying wheel spindle 33. Apertures 11, 12, 18 are formed through upper circular plate 34 of control member 20. Cylindrical wall 35 circumscribes plate 34 and interconnects conical wall 36 and plate 34. Tower 15 can be rotated on upper portion 14 in the directions indicated by arrows A.

Figure 2:
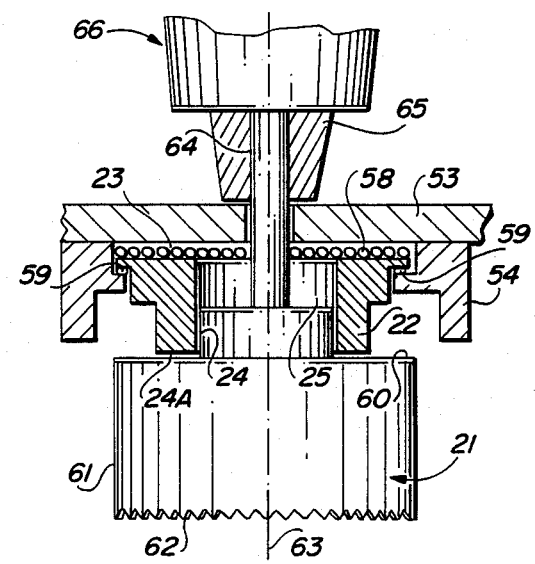
FIG. 2 is a section view of a cylindrical drill bit assembly utilized in the practice of the method of the invention.
Figure 3:
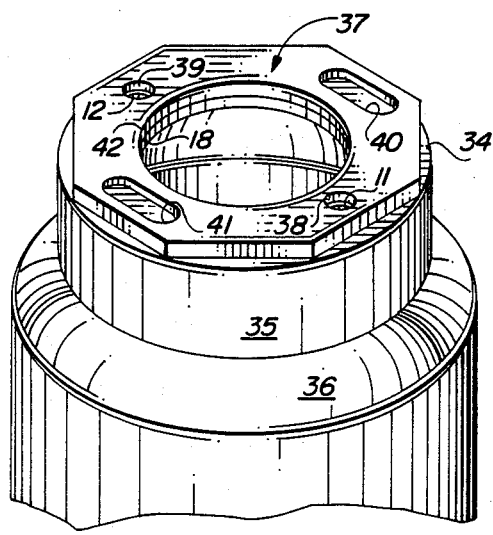
FIG. 3 is a perspective view of the upper control member of a vehicle with a template positioned on the control member to inscribe on the control member the location of secondary apertures to be formed in the control member.
Figure 8:
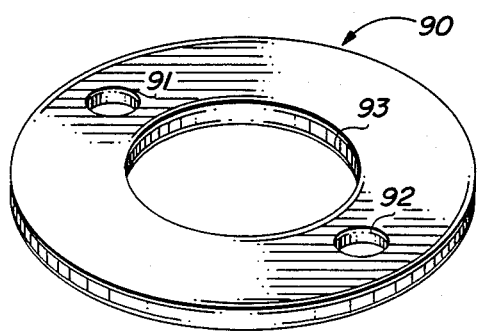
Figure 4:
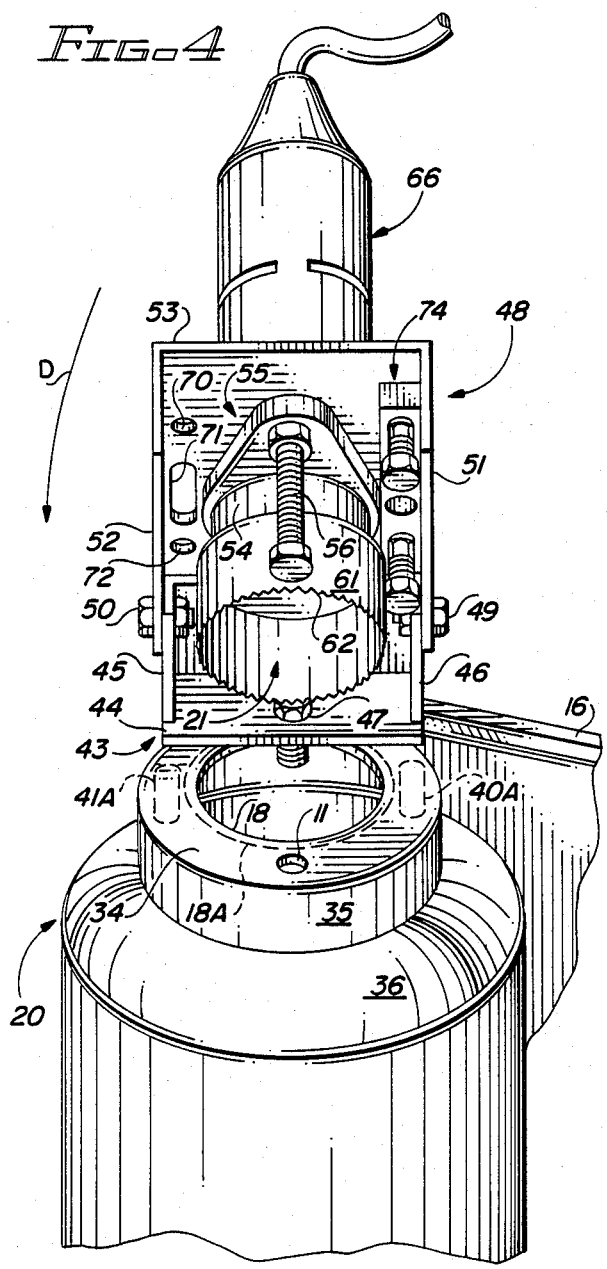
FIG. 4 is a perspective view illustrating the cylindrical drill bit assembly attached to the upper control member to cut the upper control member to enlarge the circular central aperture formed therein.

In the practice of the method of the invention, nuts 114 are loosened and tower 15 and bolts 9 are downwardly pulled away from member 20. A template 37 (FIG. 3) is placed atop member 20. Apertures 38 and 39 formed through the template align with apertures 11 and 12 formed through plate 34. Oblong apertures 40 and 41 to form inscriptions 40A and 41A (FIG. 5) on the top of plate 34. After inscriptions 40A and 41A are drawn, template 37 is removed and the drill bit assembly of FIGS. 2 and 4 is attached to upper control member 20. The drill bit assembly includes a base 43 having upstanding arms 45 and 46 connected to flat rectangular plate 44. A bolt 47 extends through an aperture (not visible) in plate 44 and through aperture 12 to secure base 43 to member 20. A lid assembly 48 is pivotally attached to base 43 by bolts 49 and 50 extending through side panels 51, 52 and arms 46, 45 respectively. Side panels 51 and 52 are perpendicular to and connected to rectangular lid 53. Drill bit support assembly 55 is bolted to lid 53 with bolts 56 and 57. Assembly 55 includes rotatable bit support member 24 riding on bearings 58 intermediate the member 24 and lid 53. Bearings 59 are also provided intermediate member 24 and housing 54. Circular lip 24A of member 24 contacts circular plate 60 to rotate with, stabilize, and support plate 60. Utilization of support member 24 in conjunction with cylindrical bit 21 is important in the utilization of the method of the invention because the center tap normally provided with cylindrical bits to stabilize and center the bits cannot be utilized in the method of the invention. The existence of circular aperture 18 makes the center drill tap normally utilized with cylindrical bits useless. Cylindrical wall 61 of bit 21 is connected along its upper circular edge to circular support plate 60. The lower edge 62 of wall 61 is adapted to cut into a material when bit 21 is rotated about central axis 63. Axis 63 is equidistant from all points on the inner surface of cylindrical wall 61. Cylindrical leg 64 is connected to plate 60 of bit 21. Leg 64 is received and secured by the chuck 65 of hand drill 66.

In FIG. 4, the drill bit assembly is attached to member 20 and shown positioned just prior to utilization of bit 21 to enlarge aperture 18 by cutting plate 34 along the points indicated by dashed line 18A. Cutting along dashed line 18A enlarges aperture 18 in the direction of arrow C (FIG. 1) and permits the position of upper end 17 in enlarged aperture 18--18A to be laterally adjusted in the direction indicated by arrows B, i.e., permits upper end 17 to be adjusted toward and away from fender 16. The drill bit assembly in FIG. 4 is operated by grasping hand drill 66, operating the drill 66 to cause bit 21 to rotate, and by pivoting the lid assembly 48 downwardly in the direction of arrow D until bit 21 cuts through plate 34 along dashed line 18A. In the presently preferred embodiment of the invention, cutting plate 34 along dashed line 18A removes an amount of material from plate 34 sufficient to remove aperture 11 from plate 34. Hence, in FIGS. 6 and 6, aperture 11 is no longer visible, since FIGS. 5 and 6 illustrate member 20 after bit 21 has cut through plate 34 along line 18A.

Figure 5:
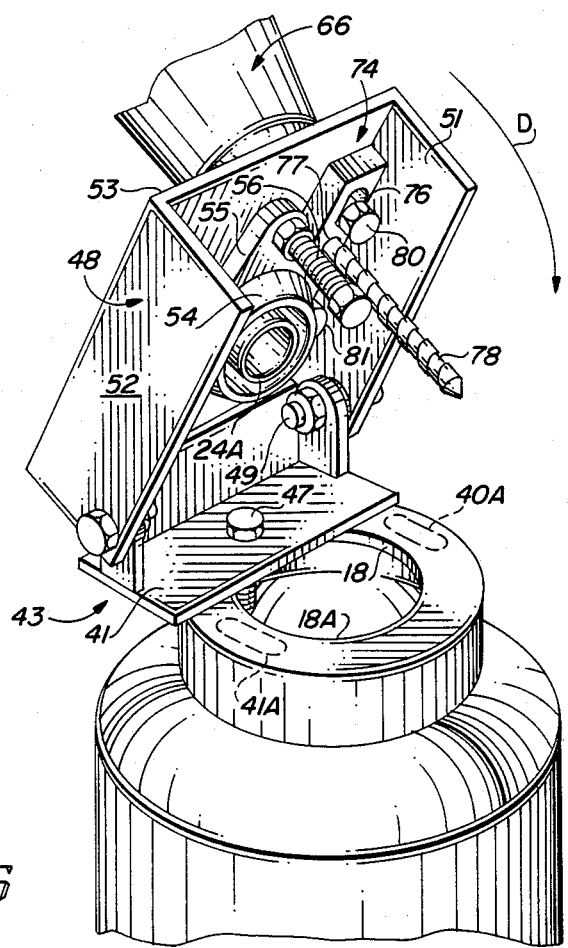
FIG. 5 is a perspective view illustrating a drill bit assembly attached to the upper control member to form secondary apertures in the control member.
Figure 6:
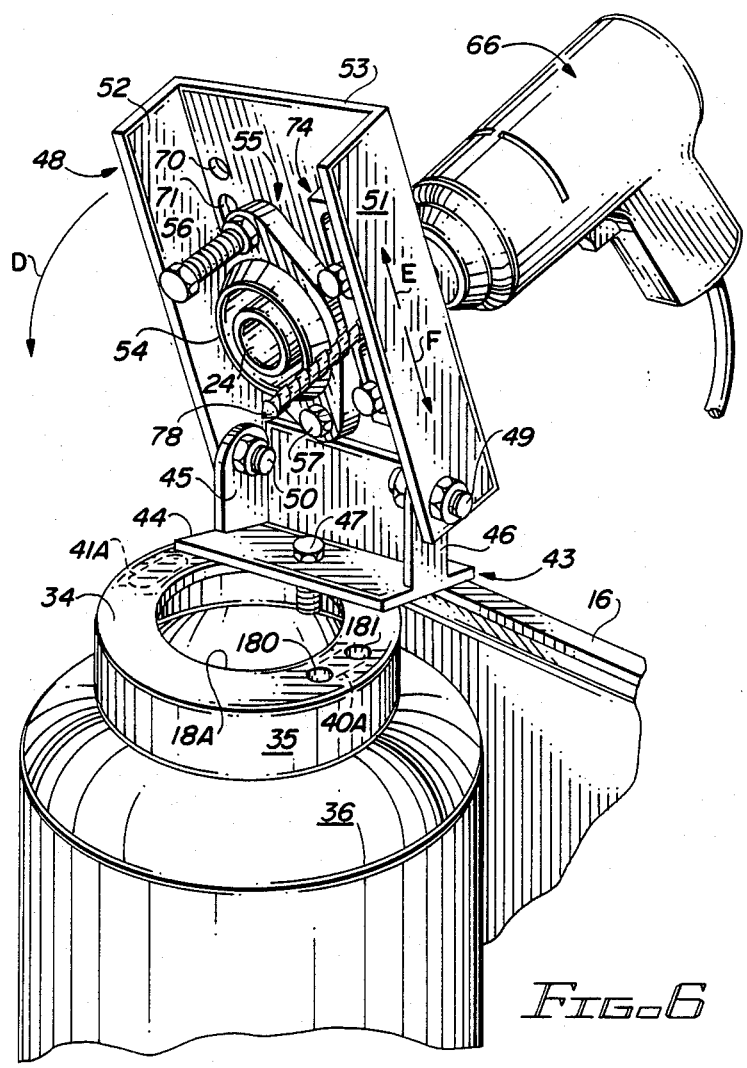
FIG. 6 is a perspective view of the drill bit assembly of FIG. 5 after the drill bit assembly has been utilized to form secondary apertures in the upper control member.
Figure 7:
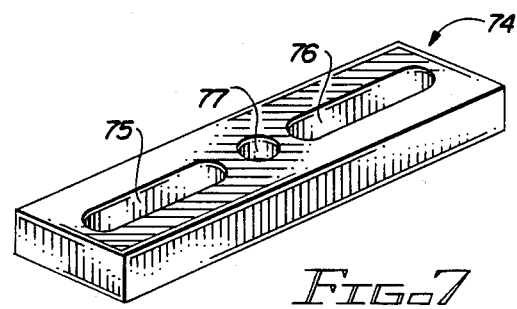
FIG. 7 is a perspective view of a component of the drill bit assembly of FIG. 6 further illustrating construction details thereof; and, FIG. 8 is a perspective view of a shim used in the method of the invention.

After aperture 18 has been enlarged with bit 21, the drill bit assembly of FIGS. 5 and 6 is utilized. Two sets of apertures 70, 71 and 72 are formed in lid 53 to either side of assembly 55. In FIG. 4 the apertures 70 to 72 to the left of assembly 55 are visible, while those to the right of assembly 55 are obscured by bracket 74. As illustrated in FIG. 7, rectangular bracket 74 has oblong apertures 75, 76, and cylindrical aperture 77 formed therethrough. Aperture 77 is sized to permit an elongate cylindrical drill bit 78 to pass therethrough and freely rotate in aperture 77. In FIGS. 5 and 6, bolt 80 passes through apertures 75 and 70. Bolt 81 passes through apertures 75 and 72. Bolts 80 and 81, when tightened, secure bracket 74 against lid 73. When bolts 80 and 81 are loosened, bracket 74 can be slid back and forth in the directions indicated by arrows E and F in FIG. 6.

When bracket 74 is slid in the directions indicated by arrows E and F, a drill bit 78 extending through apertures 71 and 77 moves in the direction of arrows E and F along with bracket 74 and aperture 77 formed therein. In the presently preferred embodiment of the invention, the length and width of apertures 71, 75 and 76 is generally equivalent to the shape and dimension of each inscription 40A and 41A. The size of inscriptions 40A and 41A is equivalent. When bracket 74 is, before bolts 80, 81 are tightened, moved in its farthest direction of travel in the direction of arrow E, the bit 78 drills a hole 180 through plate 34. Hole 180 is formed by grasping drill 66, operating the drill to turn bit 78, and pivoting lid assembly 48 downwardly in the direction of arrow D to drill hole 180. When bracket 74 is, before bolts 80 and 81 are tightened, moved in its farthest direction of travel in the direction of arrow F, bit 78 will drill a hole 181 through plate 34 (FIG. 6). Bracket 74 can be secured with bolts 80 and 81 at positions intermediate the aforementioned farthest directions of travel. Securing bracket 74 in such intermediate positions permits apertures to be drilled within inscription 40A at positions intermediate holes 80 and 181. After a plurality of holes are drilled through inscription 40A, bolts 80 and 81 are removed, bit 78 is removed from aperture 77, and bracket 74 is attached to lid 73 utilizing apertures 70 and 71 on the other side of assembly 55. Bit 78 is inserted through apertures 71 and 77, and the drill bit 78 is used to drill a plurality of holes through plate 34 within inscription 41A.

If desired, a router or other drill bit means can be utilized in place of of bit 78 to cut through plate 34 within inscriptions 40A and 41A.

After plurality of holes 180, 181, etc. are formed within inscriptions 40A and 41A, a file or other grinding means can be utilized to smooth and finish the sides of holes 180, 181 etc. such that oblong apertures are formed through plate 34 within inscriptions 40A and 41A which have a shape and dimension corresponding to the shape and dimension of 75, 76 and 71. After the holes 180, 181, etc. in inscriptions 40A and 41A have been drilled, the drill bit assembly, including base 43 and lid assembly 48, is removed from control member 20 by removing bolt 47 and lifting the drill bit assembly away from member 20 and from the vehicle. After the drill bit assembly is lifted away from member 20, shim 90 is placed on plate 34 with apertures 91 and 92 over the oblong apertures formed through plate 34 within inscriptions 40A and 41A. Circular aperture 93 (FIG. 8) of shim 90 is sized to slidably receive upper end 17 of tower 15. Tower 15 is rotated 90° from the position shown in FIG. 1. Tower 15 is then, after being rotated, moved upwardly such that upper end 17 slidably fits into aperture 93 of shim 90, such that one bolt 9 extends upwardly through the aperture formed through plate 34 within inscription 41A and extends through the aperture 91 positioned over the oblong aperture 41A, and such that the other bolt 9 extends upwardly through the oblong aperture formed within inscription 40 and through the aperture 92 positioned over the oblong aperture 40A. Upper portion 14 is then laterally adjusted in the directions indicated by arrow B to a desired position, and nuts 114 are turned onto the upper ends of bolts 9 and against shim 90 to secure the upper end 17 and shim 90 in fixed position with respect to control member 20. Moving upper portion 14 (and consequently lower portion 30 laterally in the directions indicated by arrows B alters the camber of wheel spindle 33. Since cutting a portion out of member 20 with bit 21 structurally weakens plate 34, shim 90 is utilized to insure that the product of the method of the invention is of normal or greater than normal structural strength.

Having described my invention in such terms as to enable those skilled in the art to understand and practice it, and having identified the presently preferred embodiments thereof, I claim:

1. A process for adjusting the camber of the wheel spindle carried on a lower control member of a vehicle with a compressible strut of the MacPherson type, said strut including
   an upper end extending through a first opening formed in an upper control member,
   bolt means extending through at least one aperture formed through said upper control means to secure said upper end of said strut to said upper control member,
said vehicle including a frame including said upper control member,
said process including the steps of
   (a) loosening said bolt means and removing said upper end of said strut from said opening;
   (b) placing template means on said upper control means to inscribe on said upper control member the location of at least one secondary aperture;
   (c) attaching, above said opening, to said frame circular drill bit means and means for rotating said drill bit means, said circular drill bit means including
      (i) a hollow cylindrical wall circumscribing a central axis and having a lower cutting edge for cutting a circular opening in a piece of material,
      (ii) a backing attached to said cylindrical wall, and
      (iii) a rotatable bearing-supported surface contacting said plate to rotate with and support said plate to maintain said cylindrical wall equidistant from said central axis during the cutting of a piece of material with said cutting edge,
   (d) cutting said upper control member with said drill means and rotating means to enlarge said opening to increase the range of lateral movement of said upper end in said first opening, said central axis extending through said opening during said enlarging of said opening;
   (e) cutting through said upper control member to form said secondary aperture within said inscription, said secondary aperture being sized to receive said bolt means and permit said bolt means to be moved laterally in said secondary aperture to adjust the camber of said wheel spindle;
   (f) installing shim means on said upper control member, said shim means including
      (i) a third aperture aligned over said secondary aperture, and
      (ii) a secondary opening aligned over said enlarged first opening in said upper control member;
   (g) positioning said upper end in said enlarged opening with said bolt means extending upwardly through said secondary aperture and said third aperture;
   (h) moving said bolt means to a selected position with respect to said secondary aperture; and,
   (i) tightening said bolt means to secure said upper end and shim in position on said upper control member.

* * * * *